Jan. 7, 1969     E. E. STIEPEL     3,420,343

SPINDLE CLUTCH AND BRAKE MECHANISM

Filed Jan. 31, 1967

United States Patent Office 3,420,343
Patented Jan. 7, 1969

3,420,343
SPINDLE CLUTCH AND BRAKE MECHANISM
Erhard Edwin Stiepel, Clemson, S.C., assignor to Maremont Corporation, Chicago, Ill., a corporation of Illinois
Filed Jan. 31, 1967, Ser. No. 612,967
U.S. Cl. 192—18                  6 Claims
Int. Cl. F16d 67/02

ABSTRACT OF THE DISCLOSURE

A manually controlled clutch and brake assembly for driving and stopping a spinning spindle which includes a continuously driven whirl, a rotary spindle shaft and a clutch plate mounted on the shaft to turn with and for axial movement relative to the shaft downwardly into and upwardly out of driving engagement with a driving surface on the whirl, and a manually controlled device for disengaging and braking the spindle shaft to a stop which comprises a manually rotatable actuating cam ring, a brake cup having an outwardly flanged upper end portion which overlies and is adapted to be moved upwardly by a rotational movement of the brake cam ring, and an inwardly flanged lower end portion which underlies the clutch plate, and a calibrated spring which biases the clutch plate downwardly into driving engagement with the whirl and provides a friction braking force on the clutch plate when moved upwardly from the whirl by an upward movement of the brake cup.

---

The present invention relates to an improved drive and stop mechanism, and is herein disclosed in a preferred form as embodied in a manually controlled clutch and brake assembly suitable for driving a spinning spindle and for similar applications in which the shaft is rotatably driven from a continuously driven whirl through a clutch plate which is biased to a normally engaged position, and is alternatively moved against said bias to disengage the clutch, while at the same time a brake is applied to stop the shaft.

It is a principal object of the invention to provide a novel and improved driving and braking mechanism of this general description, which is simple and acts in a highly effective manner to disconnect the clutch plate from the continuously driven whirl and simultaneously to apply a suitable braking force thereto which is effective to stop the rotation of the spindle shaft.

With the above and other objects in view as may hereinafter appear the several features of the invention will be readily apparent to one skilled in the art from the following description taken in connection with the accompanying drawing in which:

FIG. 1 is a somewhat fragmentary view in elevation with parts sectioned of a spinning spindle including a shaft connected to be driven from a continuously rotated whirl through a clutch plate connected for rotational movement therewith and axial movement relatively thereto, and a manual control operative to disengage the clutch plate from the whirl and to apply a suitable braking force to said clutch plate;

Figure 1:
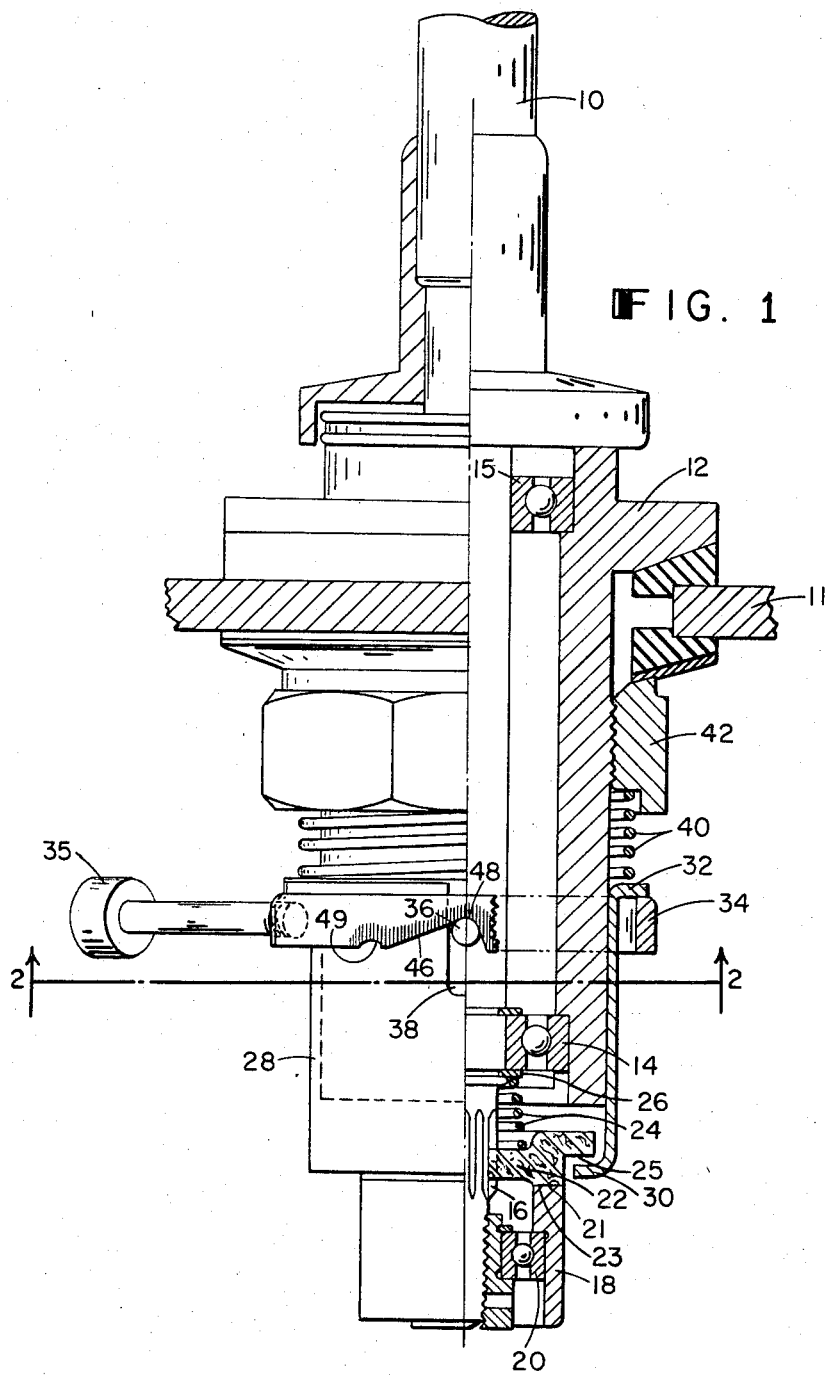

The invention is herein disclosed as embodied in a manually controlled driving and stopping mechanism for a spinning spindle mounted on the usual rail 11 which spindle comprises generally a spindle shaft 10 rotatably mounted in ball bearings 14, 15 carried within a housing 12. At its bottom end, shaft 10 carries a driving whirl 18, which is mounted on ball bearings 20, and is continuously driven by a belt, not specifically shown. The whirl is connected to drive the shaft 10 by means of a clutch plate 22 of suitable friction material which is connected by splines 16 to shaft 10 to turn the shaft and for movement axially with relation thereto. The clutch plate 22 has an inner driving surface 23 and an outer coaxial braking surface 25 on the same side thereof. Plate 22 is normally biased downwardly for engagement of its driving surface 23 with the friction surface 21 on the upper end of the whirl 18 by means of a coiled compression spring 24 seated at its upper end against a flange washer 26 on the shaft 10 and at its lower end against the clutch plate 22.

The mechanism provided in accordance with the invention for disengaging the clutch from the whirl driving surface and engaging it with a braking surface for braking the rapidly rotating shaft to a stop comprises a cylindrical brake cup 28 which is concentrically sleeved over the lower end of the housing 12 and is formed at its lower end with an inwardly bent flange 30 which underlies the outer coaxial braking surface 25 of the clutch plate 22. The upper end of the brake cup 28 is flanged outwardly at 32 to overlie a manually operable actuator ring 34 having sloping cam surfaces 46, 47 each with a running position detent 48 at one end thereof and a braked position detent 49 at the other end thereof. A pair of cam follower pins 36, 37 extend outwardly from opposite sides of housing 12 beneath cam surfaces 46, 47 to support actuator ring 34 for rotational movement relatively thereto. A handle 35 extending radially outwardly from the actuator ring 34 provides a convenient means for rotating actuator ring 34 and so move it vertically between its running and braked positions with pins 36, 37 in detents 48, 49, respectively. Pins 36, 37 pass through vertical slots 38, 39 in the brake cup 28 thereby securing the cup against turning movement while allowing same to move vertically. A coiled compression spring 40 retained at its upper end by spindle mounting nut 42 presses downwardly against the upper surface of the outwardly flanged upper end 32 of brake cup 28 to bias the cup downwardly against actuator ring 34.

Figure 2:
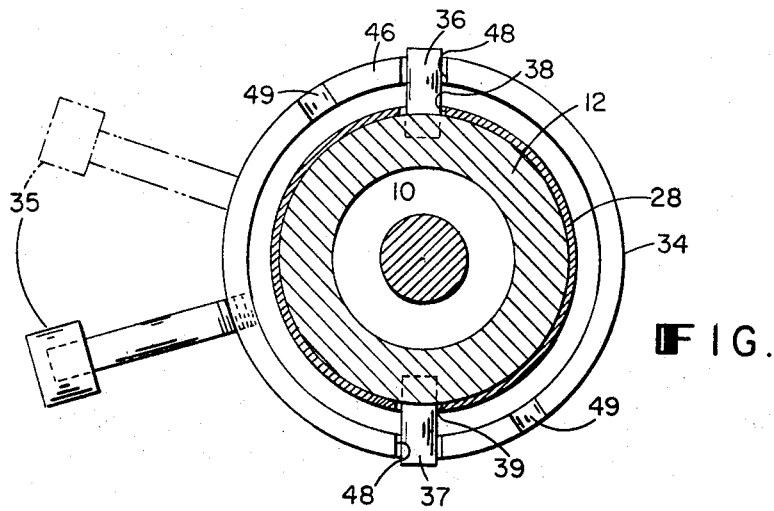
FIG. 2 is a section taken on line 2—2 of FIG. 1.

In operation, in running position, as shown in FIGS. 1 and 2, the bottom flange 30 is disengaged from the clutch plate 22 since it is spaced beneath the bottom braking surface 25 thereof when actuator 34 is supported by each of pins 36, 37 in its running position detent 48. Under these conditions, clutch plate 22 is free to move downwardly under the influence of spring 24 until its driving surface 23 is in contact with the driving surface of whirl 18.

Figure 3:
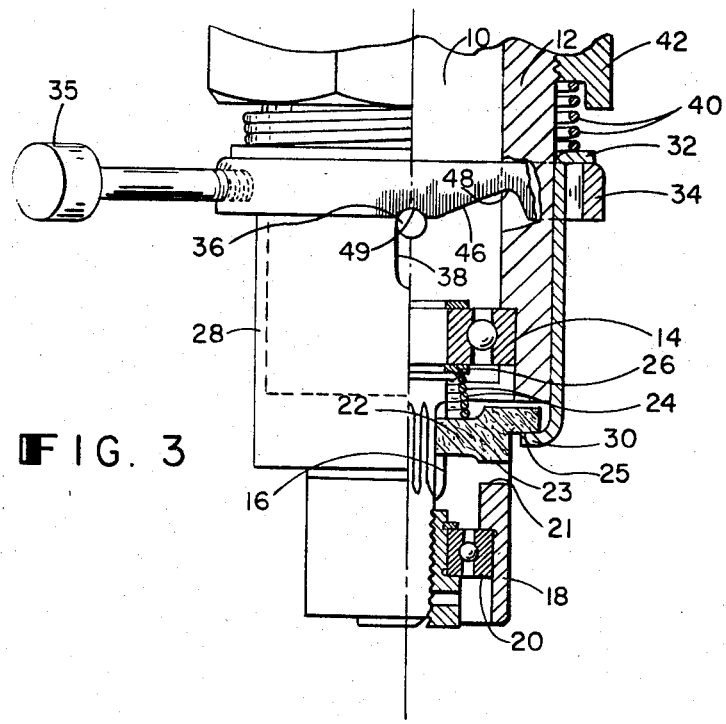
FIG. 3 is an elevational view, partly in section, showing the spindle of FIG. 1 in braked position.

When actuator ring 34 is rotated from the position as shown in FIGS. 1 and 2 to its position as shown in FIG. 3, with handle 35 in its dotted line position as shown in FIG. 2, both it and brake cup 28 are raised against the pressure of coil spring 40 as cam surfaces 46, 47 move over pins 36, 37. The lower end 30 of the brake cup is thus moved upwardly to engage and raise the clutch plate 22 against the pressure of clutch plate spring 24, creating a friction braking pressure between the clutch plate 22 and cup 28 which reaches a maximum when each of pins 36, 37 is in its braked position detent 49. This rapidly brings the spindle shaft 10 to a stop and so maintains it until actuator ring 34 is again moved to running position.

The manually controlled mechanism for driving and stopping the spinning spindle herein described has a number of important advantages which include simplicity and economy of space. In this connection, it will be noted that the entire mechanism including the whirl, the clutch plate and its connection with the shaft extension, the brake cup, and the manual control ring are disposed within a narrow compass beneath the usual spindle rail 11 on which the spinning spindle is mounted. The spindle driving and braking assembly enclosed within the brake cup 28 is well protected from lint and other contaminations. In the allustrated construction, the arrangement of the braking mechanism is such that the braking force applied is determined entirely by the strength of the spring 24 which can be calibrated to any desired value, and is in no way affected by the operation of the manual control handle 35. Further, the friction driving clutch surface of the whirl and the friction brake surface of the brake cup 28 are both arranged to act against the same side of the clutch plate 22, so that any wear on the clutch plate produced by these elements is in the same direction with the result that any wear on the clutch plate is automatically compensated for by spring 24. This assures a long operating life of the spindle shaft driving and stopping mechanism of the invention, particularly as to the clutch plate 22.

The invention having been described, what is claimed is:

1. Textile spindle driving and braking mechanism comprising
 a spindle shaft,
 a whirl having an end driving surface adapted to be continuously driven, said whirl being rotatably mounted coaxially on said shaft,
 a clutch plate mounted on said shaft above said whirl for rotation therewith and for axial movement relative to said shaft downwardly into and upwardly away from driving engagement with the whirl, said clutch plate having a driving surface and a braking surface coaxial therewith on the same side of said clutch plate,
 a driving spring normally biasing the clutch plate downwardly into driving engagement with the whirl,
 a brake element mounted coaxially with the shaft and having an inwardly flanged lower end portion providing a non-rotatable braking surface which underlies the clutch plate driving surface, said brake element being non-rotatably mounted for axial movement relatively to said clutch plate from a normal position axially spaced therebelow to a braking position with its braking surface in contact with said clutch plate and with the driving surface of said whirl spaced below said clutch plate and brake element,
 actuating means engaging said brake element for moving its lower end portion to braking position against the force of said driving spring.

2. A textile spindle as claimed in claim 1 further including
 a spindle housing having a radially extending pin and wherein said brake element has a vertically arranged pin engaging slot to prevent rotative movement of said brake element, and
 said brake element actuating means includes a rotatable actuating ring mounted coaxially with the shaft and an outwardly flanged upper end portion on said brake element which overlies said actuating ring, said ring having a cam surface formed on its lower surface for engagement with said pin, whereby rotational movement of said ring operates to raise said ring and brake element engaged thereby to a spindle shaft braking position.

3. Textile spindle driving and braking mechanism comprising
 a spindle housing having a cylindrical outer surface with an element extending outwardly therefrom,
 a spindle shaft rotatably mounted concentrically in said housing and extending therebelow,
 a whirl adapted to be continuously driven having a driving surface on its upper end and being rotatably mounted coaxially on said shaft adjacent the lower end thereof,
 a clutch plate mounted on said shaft above said whirl for rotation therewith and for axial movement relative to said shaft downwardly into and upwardly away from driving engagement with the whirl, said clutch plate having a driving surface and a braking surface coaxial therewith on the bottom side of said clutch plate,
 a driving spring normally biasing the clutch plate downwardly into driving engagement with the whirl,
 a generally cylindrical brake cup mounted coaxially with the housing for sliding movement along the outer surface thereof and having an outwardly flanged upper end portion and an inwardly flanged lower end portion providing a braking surface which underlies the clutch plate driving surface, said brake cup having a vertically arranged means engaging said housing element to prevent rotative movement of said brake cup on said housing while permitting its axial movement relatively to said clutch plate from a normal position axially spaced therebelow to a braking position with its braking surface in contact with said clutch plate and with the driving surface of said whirl spaced below said clutch plate, and
 a brake cup actuating means engaging said brake cup for moving its lower flange to braking position against the force of said driving spring, including an actuating ring mounted coaxially with the housing and brake cup and underlying said outwardly flanged upper end portion of said brake cup.

4. A mechanism as claimed in claim 3 wherein said actuating ring has a cam surface formed on its lower surface for engagement with said spindle housing element, whereby rotational movement of said ring operates to raise said ring and brake cup engaged thereby to a spindle shaft braking position.

5. A mechanism as claimed in claim 4 wherein said spindle housing element is a cam follower pin and
 said brake cup means engaging said housing element is a slot,
 said pin extending through said slot and underlying said cam surface for cooperation therewith to raise said ring upon rotation thereof.

6. Textile spindle driving and braking mechanism comprising
 a spindle housing adapted to be mounted upon and to project downwardly beneath a spindle rail of a spinning machine,
 a spindle shaft rotatably mounted in said housing and projecting therebelow,
 a whirl adapted to be continuously driven rotatably mounted on said shaft adjacent the lower end thereof,
 a clutch element mounted on said shaft above said whirl for rotation with said shaft and for axial movement relative thereto downwardly into engagement and upwardly out of engagement with said whirl,
 means normally biasing said clutch element downwardly into engagement with said whirl,
 means carried by the projecting portion of said housing for disengaging said clutch element and for applying a braking force thereto during disengagement thereof, said means including a brake cup sleeved upon and extending downwardly from the projecting portion of said housing for axial sliding movement relative thereto, said brake cup terminating adjacent said whirl and substantially enclosing and shielding said clutch element and said biasing means.

References Cited

UNITED STATES PATENTS

| | | | |
|---|---|---|---|
| 1,097,691 | 5/1914 | Wardwell | 192—18 |
| 2,660,278 | 11/1953 | Landwier | 192—18 |
| 2,825,434 | 3/1958 | Smitzer | 192—18 |
| 2,985,992 | 5/1961 | Dowdle | 192—18 XR |

BENJAMIN W. WYCHE III, *Primary Examiner.*